United States Patent Office 2,769,259
Patented Nov. 6, 1956

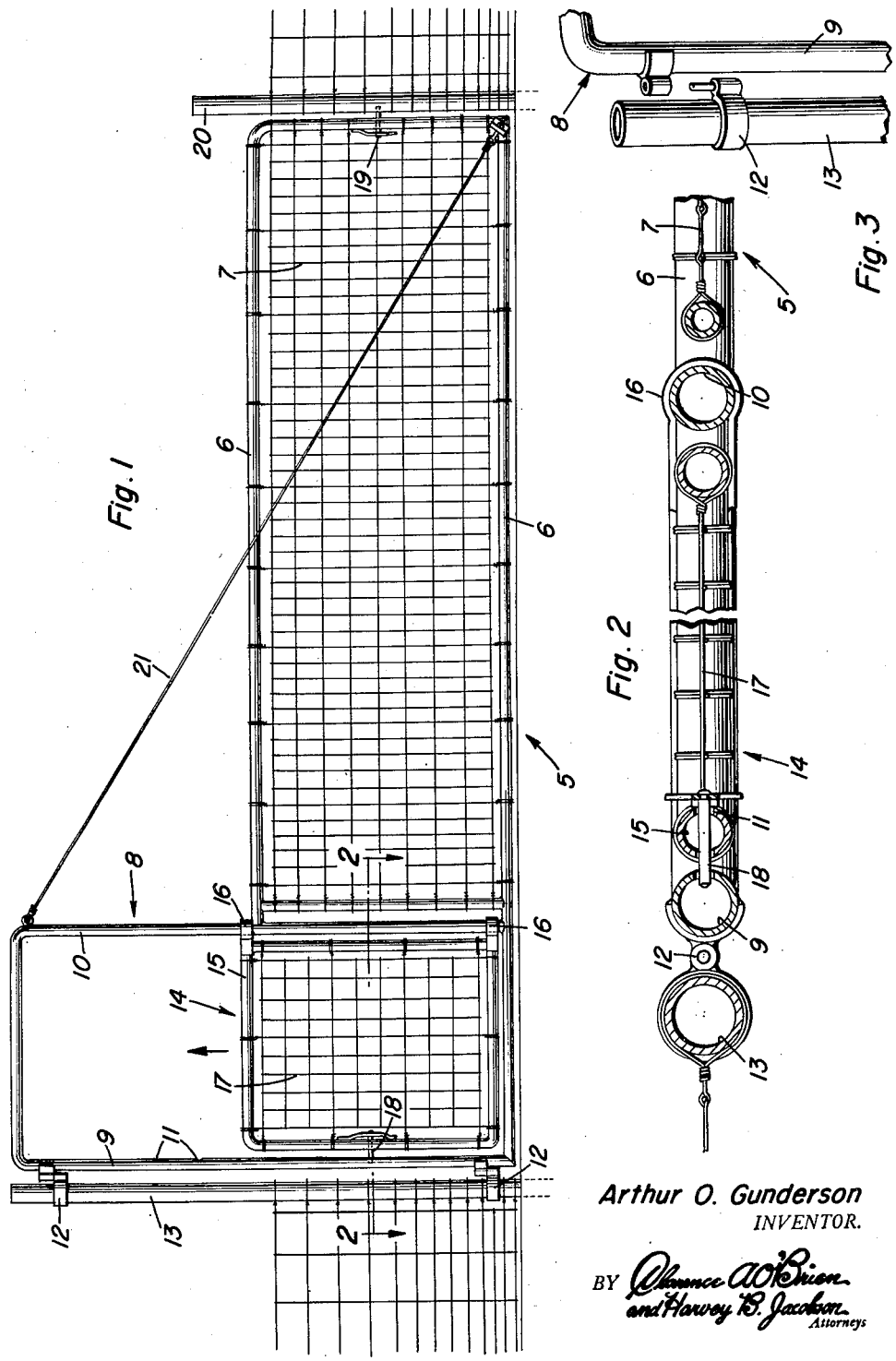

2,769,259

FARM GATE

Arthur O. Gunderson, Gifford, Iowa

Application January 17, 1955, Serial No. 482,179

2 Claims. (Cl. 39—75)

The present invention relates to new and useful improvements in gates, particularly for farms, although it will be understood, of course, that said gate may be used in any other location for which it may be found adapted and desirable.

The primary object of the invention is to provide, in a manner as hereinafter set forth, a gate of the aforementioned character which comprises a novel construction and arrangement of swingable and slidable auxiliary or secondary gate which may be independently opened for the passage of people, stock, poultry, etc., while the main gate remains closed.

Another very important object of the invention is to provide a gate of the character described wherein the auxiliary gate may be readily adjusted vertically and automatically secured for sorting the relatively large and small animals and poultry which may pass therebeneath.

Other objects of the invention are to provide a combination gate of the character set forth which will be comparatively simple in construction, strong, durable, compact, light in weight and which may be manufactured and installed at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of a gate constructed in accordance with the present invention;

Figure 2 is an enlarged view in horizontal section, taken substantially on the line 2—2 of Figure 1; and Figure 3 is an enlarged fragmentary view in perspective of the upper portion of the hinged end of the gate.

Referring now to the drawing in detail, it will be seen that the embodiment of the invention which has been illustrated comprises a multiple closure or main gate which is designated generally by reference character 5. The main gate 5 includes a horizontally elongated frame structure 6 of tubular metal. Mounted in the frame structure 6 is a woven wire panel 7.

On one end of the frame structure 6 is a vertically elongated auxiliary frame structure 8. The auxiliary frame structure 8 includes a pair of tubular uprights 9 and 10, the former having formed therein vertically spaced openings 11, the purpose of which will be presently set forth. Suitable hinges 12 connect the auxiliary frame structure 8 to a post 13 for swinging movement in a horizontal plane.

Pivotally and slidably mounted on the upright 10 of the frame structure 8 is a secondary or auxiliary gate 14. The gate 14 includes a tubular metallic frame 15 which is slidably and pivotally mounted on the upright 8 by a pair of spaced collars 16 that are attached to a side of frame 15. A woven wire panel 17 is mounted in the frame 15. Slidably mounted in the free end of the frame 15 is a spring projected, manually retracted bolt 18 which is engageable selectively in the spaced openings 11 for releasably securing the auxiliary gate in vertically adjusted position.

It is thought that the operation or use of the gate will be readily apparent from a consideration of the foregoing. Briefly, the main gate 5 is releasably secured in closed position through the medium of a suitable latch 19 on the free end thereof. The latch 19 is engageable with a conventional keeper provided therefor on the gate post 20. A strut or brace 21 extends between the upper portion of the frame 8 and the lower free end portion of the frame 6 for preventing sagging. Of course, the complete gate is opened for the passage of vehicles, herds of stock, etc. For the passage of pedestrians, large and small animals, poultry, etc., the auxiliary gate 14 may be swung to open position. When it is desired to permit the passage only of small animals, such as pigs or poultry, the auxiliary gate 14 is elevated in its frame structure 8. The spring biased bolt 18 engages in the desired opening 11 for automatically securing the gate 14 in its vertically adjusted position.

It is believed that the many advantages of a gate constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A multiple closure adapted to be mounted between a first and a second post, said closure comprising a horizontally elongated rectangular frame having upper and lower side members and an end member which is parallel to said first post, a latch for said closure arranged operatively between said end member and said first post, said lower side member being longer than said upper side member and thereby having a part which extends beyond said upper side member, an auxiliary frame connected with said rectangular frame and comprising a first upright secured to the extremity of said part of said lower side member, a second tubular upright parallel thereto and secured to said part of said lower side member and said upper side member, both of said uprights rising above said upper side member, means interconnecting the upper ends of said uprights, hinges connecting said first upright to said second post and thereby mounting the entire closure for swinging movement, said first upright having a plurality of spaced openings, an auxiliary gate disposed between said uprights, means carried by said auxiliary gate and engageable in one of said openings to hold said auxiliary gate in the closed position and engageable in the other of said openings to hold said auxiliary gate in selected raised positions, and a pair of collars secured to said auxiliary gate both slidably and rotatively mounting said auxiliary gate on said second tubular upright.

2. The multiple closure of claim 1 wherein said means to hold said auxiliary gate comprises a spring projected bolt, and there is a brace secured to the upper end of said second upright and the junction of said lower side member and said end member.

References Cited in the file of this patent

UNITED STATES PATENTS

| 1,132,438 | Carr | Mar. 16, 1915 |
| 2,587,167 | Kelley | Feb. 26, 1952 |
| 2,661,971 | Reymann | Dec. 8, 1953 |